United States Patent
Bharghavan (10) Patent No.: US 7,756,059 B1
(45) Date of Patent: Jul. 13, 2010

(54) DIFFERENTIAL SIGNAL-TO-NOISE RATIO BASED RATE ADAPTATION

(75) Inventor: Vaduvur Bharghavan, Morgan Hill, CA (US)

(73) Assignee: Meru Networks, Sunnyvale, CA (US)

( * ) Notice: Subject to any disclaimer, the term of this patent is extended or adjusted under 35 U.S.C. 154(b) by 262 days.

(21) Appl. No.: 12/123,260

(22) Filed: May 19, 2008

(51) Int. Cl.
*H04L 12/26* (2006.01)

(52) U.S. Cl. ...................... 370/252; 370/465

(58) Field of Classification Search ......... 370/229–235, 370/252, 253, 465–469
See application file for complete search history.

(56) References Cited

U.S. PATENT DOCUMENTS

| | | | |
|---|---|---|---|
| 5,038,151 A | 8/1991 | Kaminski | |
| 5,337,397 A | 8/1994 | Lebby et al. | |
| 5,966,094 A | 10/1999 | Ward et al. | |
| 6,658,047 B1 | 12/2003 | Komulainen et al. | |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channabasappa et al. | |
| 6,978,158 B2 | 12/2005 | Ghavami | |
| 7,319,685 B2 | 1/2008 | Kim et al. | |
| 7,333,455 B1 | 2/2008 | Bolt et al. | |
| 7,359,362 B2 | 4/2008 | King et al. | |
| 7,453,855 B1 | 11/2008 | Madhow | |
| 2003/0190926 A1 * | 10/2003 | Harris et al. | 455/522 |
| 2003/0198305 A1 | 10/2003 | Taylor et al. | |
| 2005/0111405 A1 | 5/2005 | Kanterakis | |
| 2005/0152314 A1 | 7/2005 | Sun et al. | |
| 2005/0152465 A1 * | 7/2005 | Maltsev et al. | 375/260 |
| 2005/0245197 A1 * | 11/2005 | Kadous et al. | 455/67.13 |
| 2006/0067389 A1 * | 3/2006 | Tounai et al. | 375/219 |
| 2006/0104340 A1 * | 5/2006 | Walton et al. | 375/227 |
| 2006/0105717 A1 * | 5/2006 | Kwon et al. | 455/63.1 |
| 2006/0187885 A1 * | 8/2006 | Roy et al. | 370/332 |
| 2006/0256848 A1 * | 11/2006 | Medvedev et al. | 375/227 |
| 2010/0030912 A1 * | 2/2010 | Finkenzeller et al. | 709/233 |

OTHER PUBLICATIONS

Habib et al. "Multi-antenna techniques for OFDM based WLAN." Proceedings of First International Conference on Next-Generation Wireless Systems, Jan. 2006, pp. 186-190.

Miaris et al. "On the base stations antenna system design for mobile communications." Electrical Engineering, 2006, pp. 157-163, vol. 88.

(Continued)

*Primary Examiner*—Ricky Ngo
*Assistant Examiner*—Gary Mui
(74) *Attorney, Agent, or Firm*—Swernofsky Law Group PC (57) ABSTRACT

Systems and methods for implementing a differential signal to noise ratio (DSNR) based rate adaptation for wireless networks are disclosed. The described methods probabilistically adapt the rate of data transmission based on an assessment of the causes of data loss. The described methods include determining a DSNR for data transmission during a predetermined window of time and adapting the transmission rate in a probabilistic manner responsive to the differential SNR and a differential SNR threshold for the data transmission.

8 Claims, 10 Drawing Sheets

OTHER PUBLICATIONS

Miura et al. "Study of array pattern tuning method using hybrid genetic algorithms for figure-8 satellite's earth station antenna." Asia-Pacific Microwave Conference Proceedings, 2000 (Abstract).

Ponnapalli et al. "Design and packaging of antennas for wireless systems." Proceedings of Electrical Performance of Electrical Packaging, 1995 (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003 (Abstract).

* cited by examiner

DIFFERENTIAL SIGNAL-TO-NOISE RATIO BASED RATE ADAPTATION

BACKGROUND

In a wireless network, access points and client devices communicate with each other by transmitting and receiving data via wireless signals. Changes in network conditions such as noise, signal strength, relative positions of the access points and client devices, the number of client devices that contend for a shared channel, available access points, etc., can affect the data transmission. For example, a given client communicating at a particular transmission rate can experience data loss when additional clients gain access to the network via a common access point. In another example, a client may experience data loss due to poor link quality.

Often, the only solution used to overcome data loss is to decrease the transmission rate for the client or clients, irrespective of the cause of the data loss. However, this may result in exacerbating the problems in data transmission in some cases. Overall, the existing techniques often produce less than acceptable results and unfavorable user experiences in dynamic real-world contexts.

Various exemplary techniques disclosed herein enable rate adaptation for wireless networks to minimize data loss by selecting appropriate rate adaptation techniques in response to the cause of the data loss.

SUMMARY

This summary is provided to introduce concepts related to rate adaptation for wireless networks, which is further described below in the Detailed Description.

Systems and methods for implementing rate adaptation for wireless networks are described. In one implementation, the method includes determining one or more causes of data loss and implementing differential signal to noise ratio based rate adaptation depending on the causes. For this, the method includes determining a signal to noise ratio (SNR) for data transmission during a predetermined time period, and adapting the transmission rate in a probabilistic manner responsive to a differential SNR and a differential SNR threshold. The method further includes determining the transmission rate for sparse-traffic client devices.

The presented summary is not intended to identify essential features of the claimed subject matter, nor is it intended for use in determining the scope of the claimed subject matter.

BRIEF DESCRIPTION OF THE DRAWINGS

The detailed description is provided with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes systems and methods for rate adaptation for wireless networks. In particular, the systems and methods relate to rate adaptation for wireless data transmission in response to a differential signal to noise ratio (DSNR) determination. While aspects of described systems and methods for implementing DSNR based rate adaptation can be implemented in any number of different computing systems, environments, and/or configurations, embodiments of the systems and methods are described in the context of the following exemplary system architecture(s).

During wireless communication, the transmission rate is adapted whenever a series of successful transmissions or a series of packet losses occur. Generally, in the case of successful transmission, the transmission rate is increased and in the case of packet loss, the transmission rate is decreased. However, packet loss can occur due to a variety of reasons and using only the technique of decreasing the transmission rate in response to packet loss can aggravate the problem in some cases.

The causes of packet loss include poor link quality that can not sustain a current transmission rate, and contention. Contention can occur when two hidden terminals which are out of range of one another (and are thereby hidden from each other); send data simultaneously over the same wireless channel. A hidden terminal can be either an access point or a client device.

As described in detail in the following disclosure, the transmission rate may be decreased, maintained at the same value or even increased in response to the cause of the packet loss. For example, if the packet loss is caused due to poor link quality, the transmission rate should generally be lowered. However, if the loss is due to contention, the transmission rate should remain the same, and some other parameter, e.g., a contention backoff value, might need to be adjusted. In some cases, if the loss is due to contention, the transmission rate may even be increased. For example, in the case of layer 2 congestion collapse, packet loss can be prevented by recognizing when losses are not due to link quality but due to contention, and increasing the rate in such cases instead of lowering it.

Layer 2 congestion collapse is a phenomenon in which the channel becomes progressively more congested as each device drives down its rate in response to perceived packet loss over the air, thereby taking up progressively more time for its retransmissions. As all transmitters drive down rate, the channel becomes unusable and devices cease to transmit successfully altogether. In such a scenario, if the transmission rate were increased, the communication channel would remain usable.

Therefore, for implementing rate adaptation, the cause of the packet loss is determined. In response to the determination, the transmission rate can be adapted in different ways.

In one implementation, to determine the cause of the packet loss, signal to noise ratio (SNR) measurements can be used. After a predetermined number of successive losses or after the loss percentage exceeds a threshold over a particular window of time, the systems and methods examine the SNR, to determine whether the losses were caused by poor link quality, or by contention.

Figure 1:
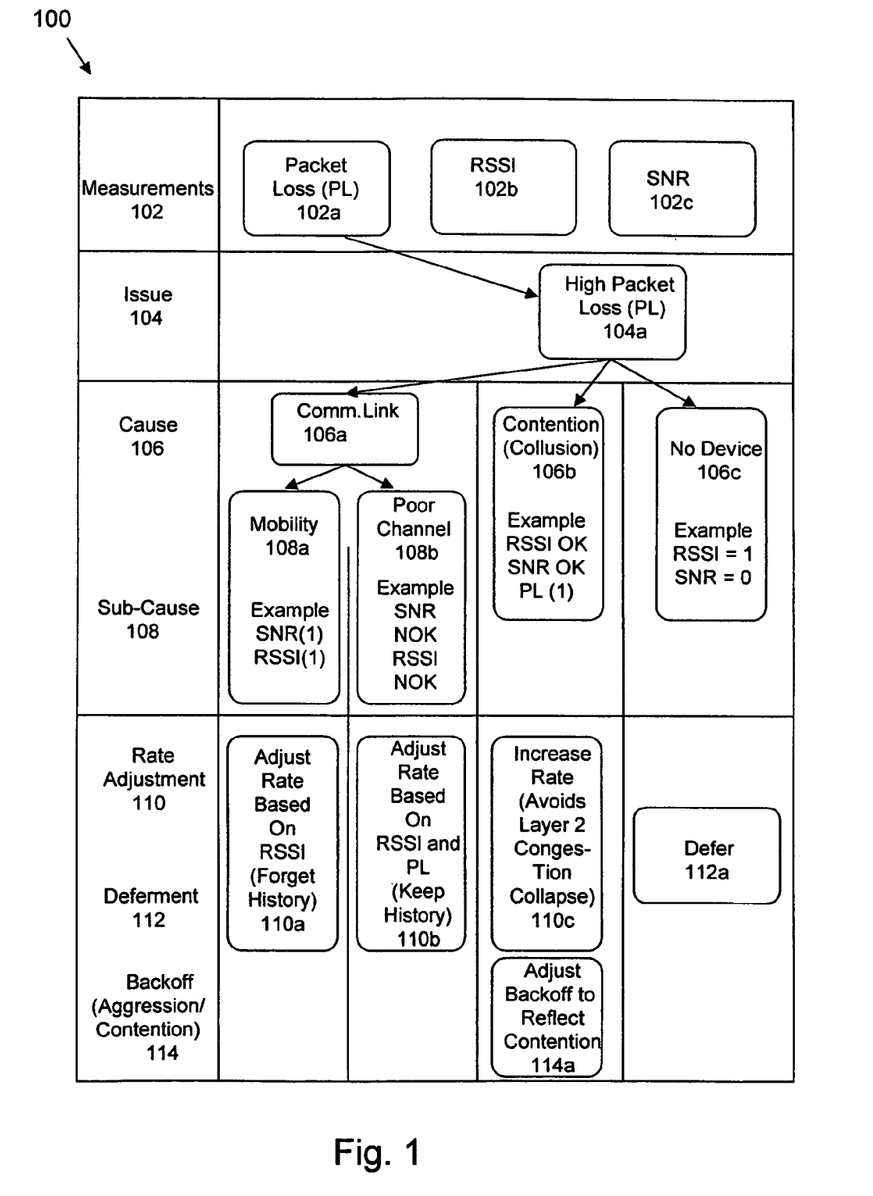
FIG. 1 illustrates a flow diagram for rate adaptation in response to one or more factors causing data packet loss.

FIG. 1 illustrates a flow diagram 100 for rate adaptation based on a determination of one or more factors causing data packet loss. For this, measurements 102, such as packet loss (PL) 102a, received signal strength indication (RSSI) 102b and signal-to-noise ratio (SNR) 102c are made for data transmitted at a current transmission rate. The measurements 102 can indicate the current state of the wireless network and the status of data transmission. In case of an issue 104 with data transmission, such as high packet loss (PL) 104a, the measurements 102 can be examined to identify the cause(s) 106 associated with the issue 104.

Typically, the cause(s) 106 can include problems with the communication link 106a, contention or collision of data packets 106b and absence of a device as indicated by no device 106c. Moreover, the cause(s) 106 can be resultants of one or more sub-cause(s) 108. For example, the problems with the communication link 106a can be due to device mobility 108a or due to poor channel conditions 108b.

For identifying the cause(s) 106 and the sub-cause(s) 108, the measurements 102 are examined over a window of time. For example, if the RSSI 102b and the SNR 102c vary as a function of time, the cause 106 can be identified as a problem with the communication link 106a due to device mobility 108a. Similarly, if both the RSSI 102b and the SNR 102c are not OK (NOK), the cause 106 can be identified as a problem with the communication link 106a due to poor channel conditions 108b.

Further, if both the RSSI 102b and the SNR 102c are OK and PL 102a varies as a function of time, the cause 106 can be identified as contention 106b. In another scenario, if both the RSSI 102b and the SNR 102c are below detection limit (i.e. zero), the cause 106 can be identified as no device 106c.

On identification of the cause 106 or the sub-cause 108, an action to minimize packet loss (PL) 102a can be taken. Examples of such actions include, but are not limited to, rate adjustment 110, deferment 112, and backoff (aggression/contention) 114. For example, the rate may be adjusted in response to RSSI alone (without taking into account the PL history) as indicated by 110a, in response to PL caused by device mobility 108a. Similarly, the rate may be adjusted in response to RSSI and PL history as indicated by 110b, or in response to PL caused by poor channel conditions 108b.

Further, the rate may be increased as indicated by 110c and backoff may be adjusted as indicated by 114a in response to PL caused by contention 106b. In another scenario, data packet transmission can be deferred as indicated by 112a in response to PL caused due to no device 106c.

Thus, the transmission rate can be adjusted in response to the issue 104 and the cause 106 or sub-cause 108.

Figure 2:
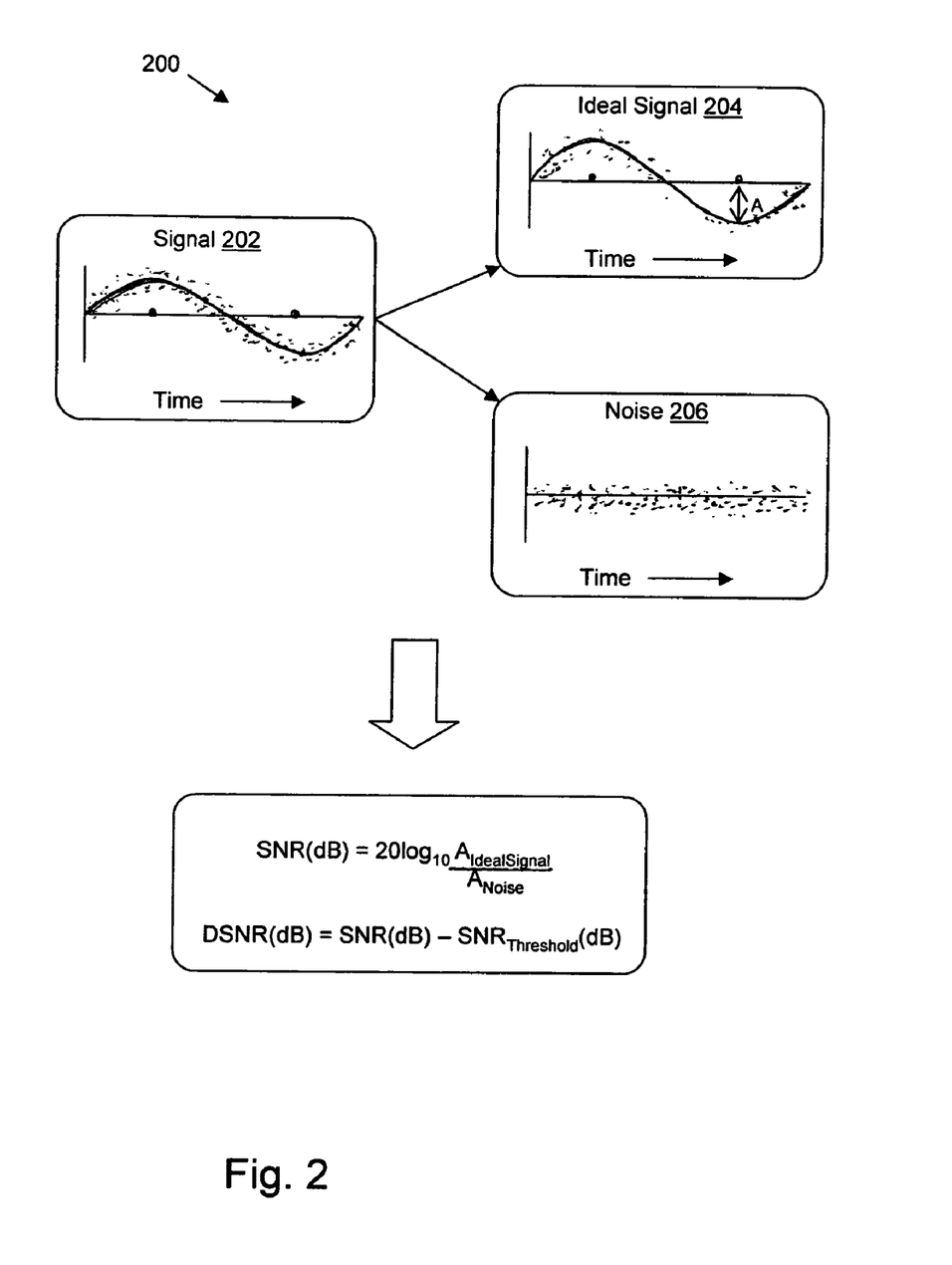
FIG. 2 illustrates an overview of SNR and DSNR concepts.

FIG. 2 illustrates the concepts of SNR and DSNR. Typically, all electromagnetic wave transmissions, such as signal 202, include an ideal or desired signal component, such as ideal signal 204, and a noise component, such as noise 206. The ideal signal 204 is that part of the signal 202 that carries the data to be transmitted, while the noise 206 is an undesirable disturbance produced by natural or man-made sources that causes distortions in the ideal signal 204. The greater the level of noise 206, higher is the level of distortion of the ideal signal 204 (and therefore of the data transmitted) in the signal 202. The quality of the signal 202 can be measured in terms of its signal to noise ratio (SNR).

The signal to noise ratio of a signal 202 is the ratio of the strength of the desired or ideal signal 204 and the strength of the background noise level 206. The higher the SNR value of a signal, lower is the extent of distortion, and therefore, better is the quality of the signal. Thus the SNR of a signal can be given by the following equation:

$$SNR = \frac{P_{Ideal\ Signal}}{P_{Noise}} \qquad (1)$$

where, $P_{Ideal\ Signal}$ is the power or strength of the ideal signal, $P_{Noise}$ is the strength of the background noise.

Usually, signals have a large range within which their SNR varies dynamically. Therefore SNR is generally represented on a logarithmic decibel scale. In decibel units SNR is given by the following equation:

$$SNR(\text{dB}) = 10\ \log_{10} \frac{P_{Ideal\ Signal}}{P_{Noise}} \qquad (2)$$

However, transmission rates are not adapted continuously in response to the SNR value, because communication devices transmit data only at certain selected transmission rates, which themselves depend on the hardware used for the wireless communication. Moreover, for avoiding data loss during transmission, various standards specify minimum SNR thresholds for the different possible transmission rates. The following table gives an exemplary mapping of transmission rates to minimum SNR thresholds as per 802.11a/b/g standards:

TABLE 1

Mapping of transmission rates to minimum SNR thresholds

| | Rate index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| | Rate (Mbps) | | | | | | | | | | | | | |
| | 1 | 2 | 5.5 | 11 | 6 | 9 | 12 | 18 | 22 | 24 | 33 | 36 | 48 | 54 |
| Minimum $SNR_{Threshold}$ (in dB) | 11 | 14 | 18 | 21 | 6 | 7 | 9 | 10 | 10 | 17 | 18 | 18 | 24 | 25 |

Such mappings of transmission rates to minimum SNR thresholds can be used to evaluate the feasibility of using a new transmission rate greater than a current transmission. Towards this end, a differential SNR (DSNR) can be determined as follows:

$$DSNR(\text{dB}) = SNR(\text{dB}) - SNR_{Threshold}(\text{dB}) \qquad (3)$$

where, SNR refers to the signal to noise ratio for a signal transmitted at the current transmission rate, and $SNR_{Threshold}$ refers to the minimum SNR threshold corresponding to the new transmission rate being evaluated.

The DSNR value indicates whether the new transmission rate can sustain data transmission without loss of data. The greater the DSNR value, the lower will be the probable data loss due to adverse channel conditions at the new transmission rate, such as fluctuations in SNR. For example, if the DSNR value is less than or equal to zero, it indicates that the network may not be able to sustain data transmission at the new transmission rate. Therefore, the trans-mission rate would not generally be increased to that new transmission rate in such a case. Instead, the transmission rate may be lowered if consistent packet loss is experienced.

On the other hand if the DSNR value is greater than zero, it indicates that the packet loss is not due to poor link conditions, and may be due to contention. The DSNR value is then compared with a DSNR threshold ($DSNR_{threshold}$) value to determine whether the transmission rate may be increased. The DSNR threshold value reflects the confidence that the new transmission rate can be used without loss of data. $DSNR_{threshold}$ values are a set of constant values, each value corresponding to a transmission rate, that are predetermined based on a physical knowledge of the SNR requirements for the trans-mission rates.

If the DSNR at the new transmission rate is greater than the $DSNR_{threshold}$, the transmission rate is increased to the new transmission rate. Otherwise, the transmission rate is increased probabilistically based on the ratio of the DSNR to the $DSNR_{threshold}$. Use of the DSNR value to assess whether the new transmission rate can be selected for data transmission is explained in other and further detail in the following sections.

Exemplary Environment

Figure 3:
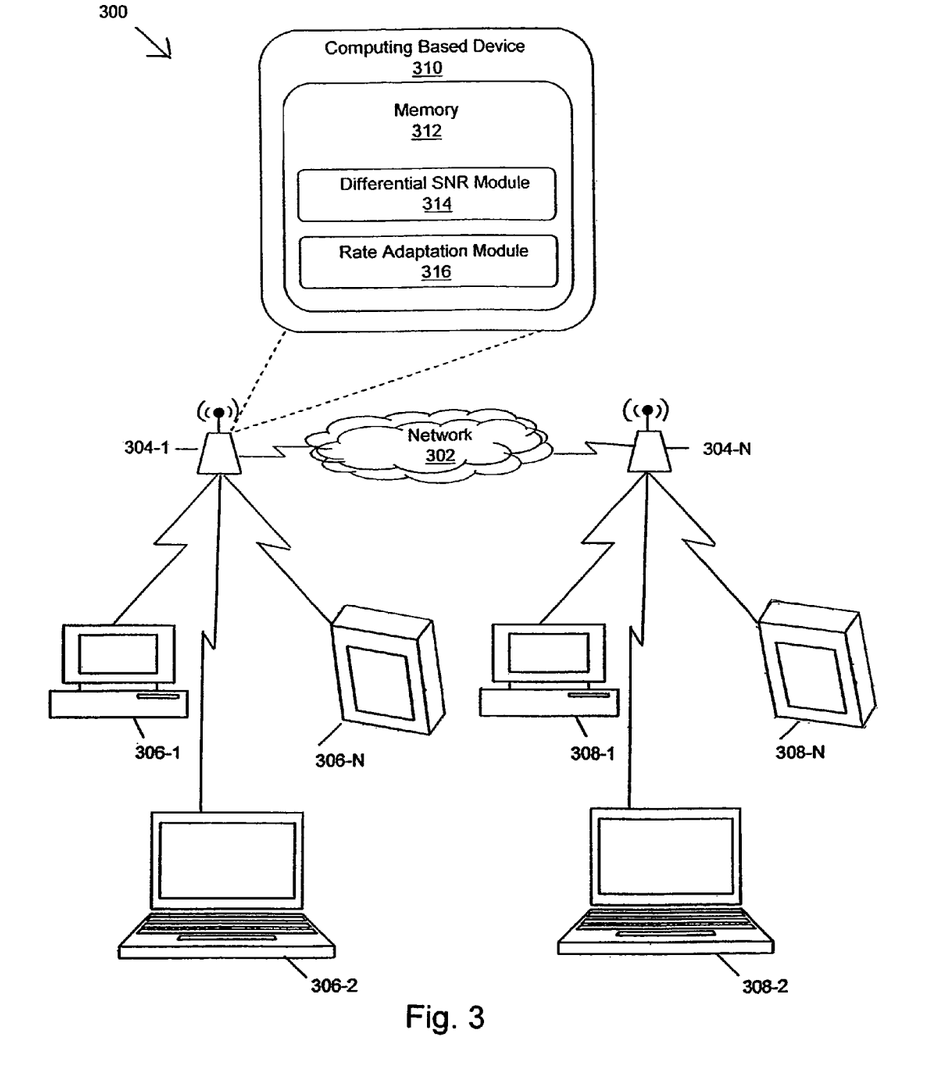
FIG. 3 illustrates a wireless communication environment for implementing rate adaptation.

FIG. 3 illustrates an exemplary wireless communication environment 300 that includes a network 302 communicatively coupled to multiple access points 304-1, 2 . . . n, each of which can communicate with a plurality of client devices. As illustrated, the access points 304-1 and 304-n can communicate with client devices 306-1, 2 . . . n and 308-1, 2 . . . n respectively. For purposes of discussion, access points 304-1,2, . . . , n, will be interchangeably referred to as access points 304, and the client devices 306-1,2, . . . , n, 308-1,2, . . . , n will be referred to as client devices 306, 308 respectively.

The network 302 can be a wireless or a wired network, or a combination thereof. The access points 304 allow the client devices 306, 308 to access the network 302 and their associated resources using electromagnetic waves (e.g., typically in the high RF or microwave spectra). The client devices 306, 308 can be implemented as any of a variety of wireless enabled computing devices, including, for example, a server, a desktop personal computer (PC), a notebook or portable computer, a workstation, a mainframe computer, a mobile computing device, an entertainment device, an internet appliance, etc. The access points 304 communicate with the client devices 306, 308 by transmitting and receiving data via wireless signals.

Generally, changes in network conditions, user mobility, contention, etc. can affect data transmission in wireless communication environments, such as the communication environment 300. The network conditions can include multipath, shallow or deep fade, cross-channel interference, non-protocol compliant transmitter interference (e.g. microwave ovens), thermal effects based signal distortion, etc. Random channel errors can occur due to changes in network conditions, such as random fluctuations in signal-to-noise ratio (SNR), which can result in random data losses at a given transmission rate.

User mobility or movement of a client device communicating with an access point, such as the client device 306-2 communicating with the access point 304-1, can affect data transmissions due to an increase or decrease in the physical signal strength and/or changes in the background noise.

Further, losses due to data collision or contention can occur when two hidden terminals which are out of range of one another send data simultaneously over the same wireless channel. Losses due to contention can also occur when multiple client devices communicating with the same access point send data simultaneously, leading to data collision at the receiving access point. For example, if both the client devices 306-1 and 306-2 illustrated in FIG. 3 send data simultaneously over the same wireless channel to the access point 304-1, this can cause data collision at the access point 304-1.

The various techniques of rate adaptation described herein can be used to adapt rate of data transmission in such cases. Other cases where the various techniques of rate adaptation described herein can be used include, for example, when a client device communicating with an access point has little data for transmission during a window of time.

Consider a client device 306-1 that uses a network application such as ping or telnet to communicate with the access point 304-1 for a brief period of time. During this period of time, the client device 306-1 produces a data packet once every second and behaves as a sparse-traffic client device. The rate adaptation techniques described herein can also be used to select a transmission rate for data transmission by such a client device that behaves temporarily in a sparse traffic mode and then suddenly becomes active.

Accordingly, as illustrated in FIG. 3, one or more access points 304 in the wireless communication environment 300 include a computing based device 310 for implementing rate adaptation for wireless networks. Though the computing based device 310 is illustrated as being a part of the access points 304, it will be understood that the computing based device 310 can also be included as a part of the client devices 306, 308.

The computing based device 310 includes a processor and a memory 312 that includes a differential SNR module 314 and a rate adaptation module 316. The differential SNR module 314 receives a signal to noise ratio (SNR) measurement for data transmissions at a current transmission rate, over a window of time. The window of time can be measured in time units or as number of frames transferred. The number of frames over which the SNR measurement received by the differential SNR module 314 is measured can be a predetermined number and can vary, for example, between 1 and 3.

The differential SNR module 314 can then determine a differential signal to noise ratio (DSNR) based on the received SNR and a $SNR_{threshold}$ corresponding to a new transmission rate to be evaluated. If the DSNR value is greater than zero, this indicates that the link quality may support a higher transmission rate. In such a case, the differential SNR module 314 also determines a ratio of DSNR to $DSNR_{threshold}$ for the new transmission rate.

The rate adaptation module 316 can then select the new transmission rate based on the SNR, DSNR and the ratio of DSNR to $DSNR_{threshold}$. The selection of the new transmission rate also depends on whether the client device to which data is to be transmitted was operating in a sparse traffic mode or not. The client device 306 can be considered to operate in a sparse-traffic mode if the time-averaged interval between two consecutive transmissions of data is larger than a predetermined threshold value.

For example, in one implementation, if the client device is not operating in the sparse traffic mode and if the ratio of DSNR to DSNR threshold lies between 0 and 1, the rate adaptation module 316 selects a new transmission rate such that the probability of selecting the new transmission rate increases as the ratio of DSNR to DSNR$_{threshold}$ reaches unity. Selection of new transmission rates is discussed in other and further detail below with reference to FIGS. 4-9.

Figure 4:
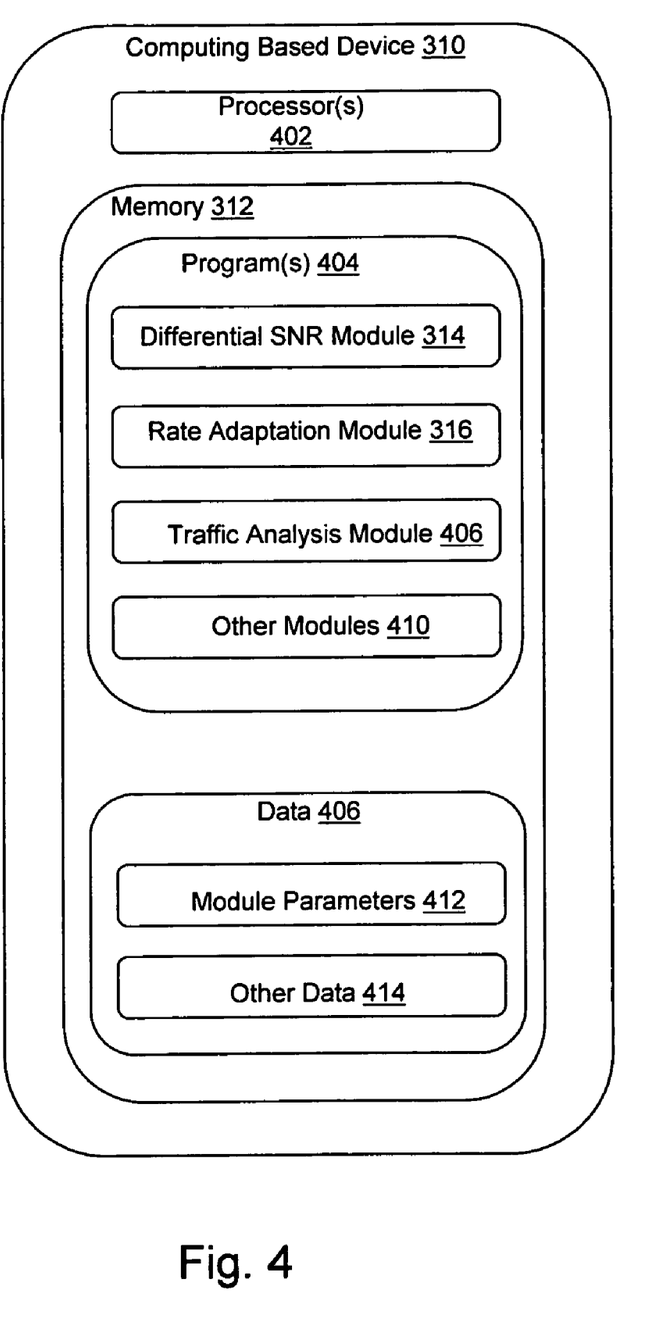
FIG. 4 illustrates an exemplary computing device for implementing rate adaptation for wireless networks.

FIG. 4 illustrates an exemplary computing based device for implementing DSNR based rate adaptation for wireless networks. The computing based device 310 includes a processor 402 operatively coupled to the memory 312. The computing based device 310 can be implemented as a part of an access point, or a client device in a wireless network.

The memory 312 can be any computer-readable media in the form of volatile memory, such as Random Access Memory (RAM) and/or non-volatile memory, such as Read Only Memory (ROM) or flash RAM. The memory 312 typically includes data and/or program modules for implementing rate adaptation that are immediately accessible to and/or presently operated on by the processor 402. In one implementation, the memory 312 includes program(s) 404 and data 406. The program(s) 404 include the differential SNR module 314, the rate adaptation module 316, a traffic analysis module 408, and other modules 410. The data 406 stores module parameters 412 and other data 414 in the memory 312 of the computing based device 310.

In one implementation, the traffic analysis module 408 determines whether the device 306 is operating in a sparse traffic mode. The traffic analysis module 408 performs the determination based on the average time interval between two consecutive transmissions over a window of time. The time period during which the client device 106 operates in the sparse traffic mode can be considered as an idle period. The traffic analysis module 408 can use a timer to measure the time interval.

In case the device 306 is found to be operating in a sparse traffic mode, the rate adaptation module 316 adapts the transmission rate based on the SNR of the last transmission and current transmission. For example, consider the measured SNR value before the idle time period to be SNR$_1$, and the measured SNR value for the current transmission just after the idle time period to be SNR$_2$.

If the rate adaptation module 116 determines that the SNR$_1$ is lesser than or equal to the SNR$_2$, the rate adaptation module 116 retains the current transmission rate and adapts rate in a manner similar to that for a non-sparse traffic device. On the other hand, if the rate adaptation module 116 determines that the SNR$_1$ is greater than the SNR$_2$, the rate adaptation module 116 selects the new transmission rate based on transmission rate that can be supported by the SNR$_2$ value.

In one implementation, the rate adaptation module 116 may implement rate adaptation for a device operating in a sparse traffic mode within the 802.11a/b standard using the following pseudo-code:

```
SNR = RssiAverage − BackgroundAverage;
  // compute the SNR value for the currently received frame by taking the
  //difference between the signal strength and the background noise level
if ((SNR >= pSta->LastSNR || (pSta->LastSNR − SNR < 4)) &&
Retries == 0)
  // when current SNR is stronger, or not big decrease, compared with the
```

```
  // previous frame of the same station
    pSta->LastSNR = SNR;        //record the SNR value
    retain_rate(pSta);           // keep the same rate
    prob_rate_increase (pSta, pframe);  // see if it can increase the rate
                                         //probabilistically using SNR
else
  // if the current SNR has a big decrease, or last packet has retries,
  // set rate by SNR
    if( pframe->mpduRate[0] > 3 ) // if it supports 802.11a/g rate options
        if( SNR >= 24 )          set_rate(pSta,12);
        else if ( SNR >= 17 )    set_rate(pSta,9);
        else if ( SNR >= 9 )     set_rate(pSta,6);
        else                     set_rate(pSta,4);
    return;
    Else   // if it supports 802.11b rate options
        if( SNR >= 19 )          set_rate(pSta,3);
        else if ( SNR >= 15)     set_rate(pSta,2);
        else if ( SNR >= 12)     set_rate(pSta,1);
        else                     set_rate(pSta,0);;
```

In case the traffic analysis module 408 determines that the device 106 is not a sparse traffic device, the rate adaptation module 116 probabilistically adapts the transmission rate based on the DSNR and the ratio of DSNR to DSNR$_{threshold}$. The differential SNR module 114 provides the various parameters for rate adaptation including SNR, SNR$_{threshold}$, DSNR, DSNR$_{threshold}$ etc used by the rate adaptation module 116. The differential SNR module 114 stores the parameters in the module parameters 412 of the data 406 stored in the memory 112.

In particular, the rate adaptation module 116 can either increase or decrease the transmission rate over the communication channels responsive to wireless channel conditions as reflected by the DSNR and DSNR threshold values at any point of time. The new transmission rate selected can be a discrete value and can be determined by various channel characteristics. In one embodiment, the new transmission rate can be set according to the 802.11a/b/g standards.

In one implementation, if the DSNR value is lesser than or equal to zero, the rate adaptation module 116 either retains the current transmission rate, or decreases the transmission rate on observing successive packet loss. In such cases, the probability to increase the current transmission rate to the new transmission rate can be set to zero. On the other hand, if the DSNR value is greater than zero, and greater than the DSNR$_{threshold}$, the rate adaptation module 116 can increase the transmission rate to the new transmission rate. In such cases, the probability to increase the current transmission rate is set to 1.

However, if the DSNR value is if the DSNR value is greater than zero, but lesser than or equal to the DSNR$_{threshold}$, the rate adaptation module 116 selects the new transmission rate probabilistically. In such cases, the probability of selecting the new transmission rate increases as the ratio of DSNR to DSNR$_{threshold}$ (P) approaches unity.

In one implementation, the rate adaptation module 116 uses a uniformly distributed random number R to implement the probabilistic selection of transmission rate. The random number R can be any number generated between 0 and 1 using methods stored in the other modules 410. The rate adaptation module 116 compares the generated random number R with the ratio P. If P is greater than or equal to R, the new transmission rate is selected by the rate adaptation module 116. On the other hand, if P is lesser than R, the new transmission rate is not selected by the rate adaptation module 116.

In one implementation, the rate adaptation module 116 may implement the probabilistic rate adaptation for a device operating within the 802.11a/b standard using the following pseudo-code:

```
ASNR=Compute-average-SNR-over-time-window
    (frames-in-window, SNR); // for each frame in the current window
if( pframe->mpduRate[0]>3) // check if it supports 802.11a rate options
    i=13;
else //the default is to support 802.11b rate options
    i=4;
for( ; i>current_rate ; i--)
    // perform the probabilistic rate increase based on the differential SNR
    // estimate for each higher rate option
    DSNR[i]=ASNR−SINR[i];
        //compute differential SNR estimate for rate I; SNR
            [i] is the // minimum required SNR threshold value at rate i
    if( DSNR[i]<=0 || i ==8 || i ==10) continue;
        // if DSNR is less than zero, use the current rate
    p=DSNR[i]* 100/DSNR_THRESHOLD;
        //compute the probability to increase the rate to rate i r=rand( ) % 100;
        //generate a random number between [0,1]
    if(p>r)
        // compare the probability p with the random number r Set_rate(i);
        // probabilistically increase rate to rate index i
        Return;
```

Thus the rate adaptation module 116 can adapt the transmission rate probabilistically to increase the transmission rate when data loss or packet loss occurs despite the channel conditions such as SNR and RSSI being acceptable. In such scenarios, the systems and methods increase the transmission rate by the above described rate adaptation method and thus avoid Layer 2 congestion collapse.

It will be understood that the above described rate adaptation techniques based on SNR and DSNR can also be used in combination with one or more conventional rate adaptation techniques such as those based on data loss ratio, transmission throughput, transmission success count, transmission failure count, etc.

Exemplary Processes

Figure 5:
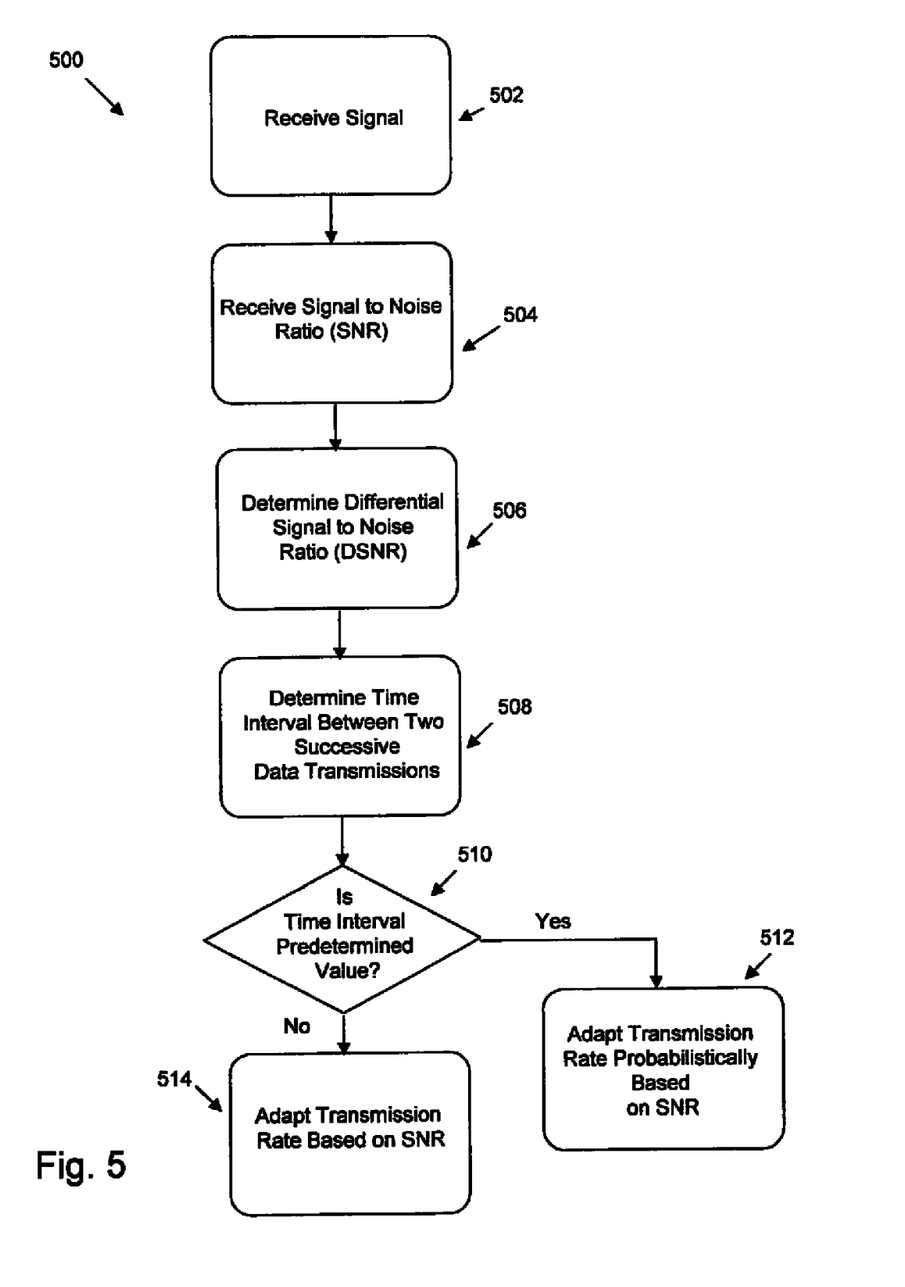
FIG. 5 illustrates an exemplary process for rate adaptation for wireless networks.

FIG. 5 illustrates an exemplary process 500 for the rate adaptation for wireless networks. The exemplary process 500 performs rate adaptation for data transmitted through one or more client devices 106 deployed over the wireless networks. In one aspect, the exemplary process 500 can be used alone for rate adaptation. In other aspect, the exemplary process 500 can be used in combination with the other existing rate adaptation methods.

The method 500 may, but need not, be implemented at least partially in an architecture such as that shown in FIGS. 1-4. Also, it should be understood that certain acts in the method need not be performed in the order described, may be modified, and/or may be omitted entirely, depending on the circumstances.

At block 502, the differential SNR module 114 receives the signal, such as signal 202. The received signal 202 can be a combination of the ideal signal 204 and the noise 206. The ideal signal 204, i.e., the desired signal component, can carry data to be transmitted, whereas the noise 206, the undesired signal component or disturbance produced by natural or human-made sources, causes various distortions in the ideal signal 204.

At block 504, the differential SNR module 114 receives the signal to noise ratio (SNR). The signal to noise ratio is the ratio of the strength of the ideal or the desired signal 204 to the strength of the noise 206. The higher the SNR value of the signal 202, the better the quality of the signal 202. The SNR value can be measured in decibel units as described earlier.

At block 506, the differential SNR module 114 determines the differential signal to noise ratio (DSNR), measured in decibel units. The DSNR is the difference between the measured SNR of the received signal 202 and the $SNR_{Threshold}$. The $SNR_{Threshold}$ is interchangeably referred to as the minimum SNR threshold. In one embodiment, various 802.11a/b/g standards provide the minimum SNR thresholds for different possible transmission rates.

At block 508, the traffic analysis module 408 determines the time interval between two consecutive data transmissions. In one implementation, the traffic analysis module 408 can be invoked by the rate adaptation module 116 to measure the time interval.

At block 510, the differential SNR module 114 compares the time interval with a predetermined timeout value to determine if the client is operating in a sparse traffic mode. In one embodiment, the predetermined timeout value can be 1.5 seconds. If the measured time interval is less than the predetermined timeout value, the "YES" path can be traced to block 512. If the measured time interval is greater than or equal to the predetermined timeout value, a "NO" path can be traced to block 514.

At block 512, the rate adaptation module 116 performs rate adaptation probabilistically based on the DSNR value after tracing the "YES" path from block 510. Here, the rate adaptation module 116 either increases or decreases the transmission rate based on the link quality as determined by the DSNR value and the DSNR threshold.

At block 514, the rate adaptation module 116 performs rate adaptation based on SNR values after tracing the "NO" path from the block 510. Here, the rate adaptation module 116 adapts the transmission rate based on the SNR values corresponding to transmissions by the client devices 106, before and after the idle time interval.

Figure 6:
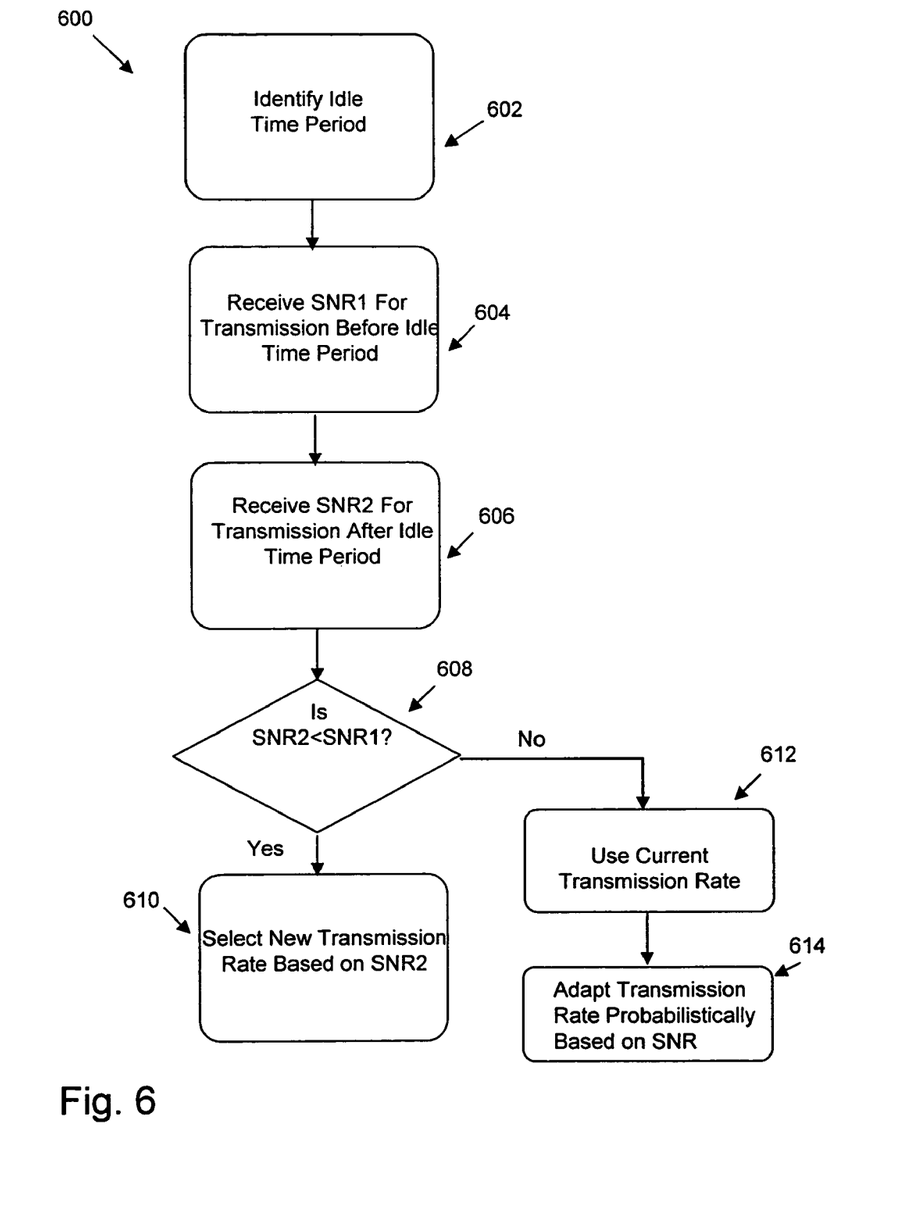
FIG. 6 illustrates an exemplary process for rate adaptation in response to SNR.

FIG. 6 illustrates an exemplary process for rate adaptation based on SNR, for a device that was temporarily operating in the sparse traffic mode. The blocks in the exemplary process 600 are executed by the rate adaptation module 116 for such a device in the wireless network 102.

At block 602, the rate adaptation module 116 receives notification from the traffic analysis module 408 that the client device is operating in the sparse traffic mode and that the time interval monitored is an idle time period.

At block 604, the rate adaptation module 116 receives the signal to noise ratio for data transmission before the idle period began. In one implementation, the determined signal to noise ratio value can be represented as SNR.

At block 606, the rate adaptation module 116 determines the signal to noise ratio for data transmission after the idle period ends, i.e. current data transmission. In one implementation, such signal to noise ratio value can be represented as SNR2.

At block 608, the rate adaptation module 116 compares SNR2 with SNR1. When the SNR2 value is lesser than the SNR1 value, a "YES" path can be traced to block 610. When the SNR2 value is greater than or equal to the SNR1 value, a "NO" path can be traced to block 612.

At block 610, the rate adaptation module 116 selects a new transmission rate based on SNR2 value when the "YES" path is traced from the block 608. In one implementation, the rate adaptation module 116 uses the transmission rate to SNR mappings based on 802.11a/b/g standards to select the new transmission rate.

At block 612, the rate adaptation module 116 uses the current transmission rate that was used after the idle period for data transmission when the "NO" path is traced from the block 608.

At block 614, the rate adaptation module 116 then adapts the current transmission rate probabilistically based on DSNR value as explained with reference to FIG. 7 below.

Figure 7:
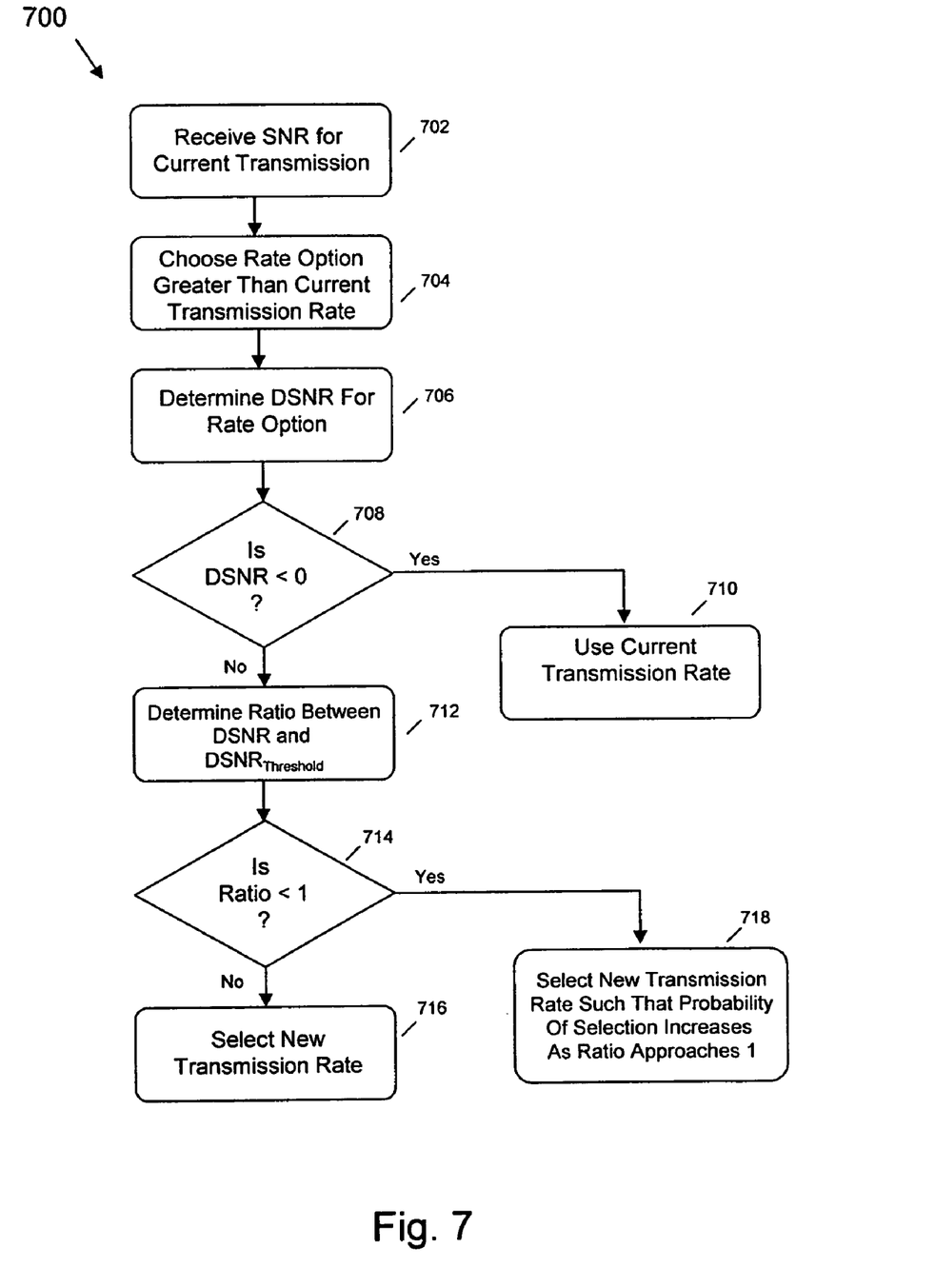
FIG. 7 illustrates an exemplary process for rate adaptation in response to DSNR.

FIG. 7 illustrates an exemplary process for rate adaptation based on DSNR. The exemplary process 700 is executed when the client device is not a sparse traffic device (i.e. at block 512), or when the rate adaptation module selects the current transmission rate (i.e. at block 614). The process 700 is based on the DSNR and DSNR threshold values.

At block 702, the differential SNR module 114 determines the signal to noise ratio, SNR for the current transmission.

At block 704, the rate adaptation module 116 chooses a new transmission rate option greater than the current transmission rate. The new transmission rate option can be selected from one of the possible transmission rates that can be supported by the system hardware. In one embodiment, the possible transmission rates can be 1, 2, 5.5, and 11 Mbps (Megabytes per second). In another embodiment, the possible transmission rates can be 6, 9, 12, 18, 24, 36, 48, and 54 Mbps. In a further embodiment, the possible transmission rates can be 1, 2, 5.5, 6, 9, 11, 12, 18, 24, 36, 48, and 54 Mbps. Similarly, other possible transmission rates can be used in various embodiments.

At block 706, the differential SNR module 114 determines the differential signal to noise ratio or DSNR corresponding to the new rate option selected at the block 704.

At block 708, the rate adaptation module 116 determines whether the value of DSNR is greater than zero or not. When the value of DSNR is lesser than zero, a "YES" path is traced to block 710 while a "NO" path is traced to block 712 when the value of DSNR is greater than or equal to zero.

At block 710, the rate adaptation module 116 selects the current transmission rate for further data transmissions when the "YES" path is traced from the block 708. This is because, when DSNR<0, the link quality is not good enough to support the higher transmission rate. In such a case, if the previous N transmission were successful, the rate adaptation module 116 will maintain the current transmission rate. Else, if the previous N transmission were not successful, the rate adaptation module 116 deduces that the cause of failure is at least poor link quality and decreases the transmission rate.

However, when the DSNR>0 the link quality may support a higher transmission rate. In such a case, if the previous N transmissions were not successful, the rate adaptation module 116 deduces that the cause of failure is not link quality and may be contention. In such a case the rate adaptation module 116 may adjust backoff to reflect contention. Further, the rate adaptation module 116 increases the transmission rate probabilistically as described below.

At block 712, the differential SNR module 114 determines the ratio between the computed DSNR and a differential SNR threshold when the "NO" path is traced from the block 708. The ratio of DSNR to DSNR threshold can be greater than or equal to 1, or can vary between 0 and 1.

At block 714, when the ratio of the computed DSNR and the DSNR threshold is greater than or equal to 1, a "NO" path is traced to block 716, while a "YES" path is traced to block 718 when the ratio is less than 1.

At block 716, when the ratio is greater than or equal to 1, the rate adaptation module 116 selects a new transmission rate, i.e. the probability of selection of the new transmission rate is set to 100%.

At block 718, the rate adaptation module 116 selects the new transmission rate such that the probability of selection increases as the ratio approaches unity. In one implementation, the selection of a new transmission rate is based on a comparison of the ratio P (the ratio of the DSNR and the differential SNR threshold) with a uniformly distributed random number R generated between 0 and 1.

Figure 8:
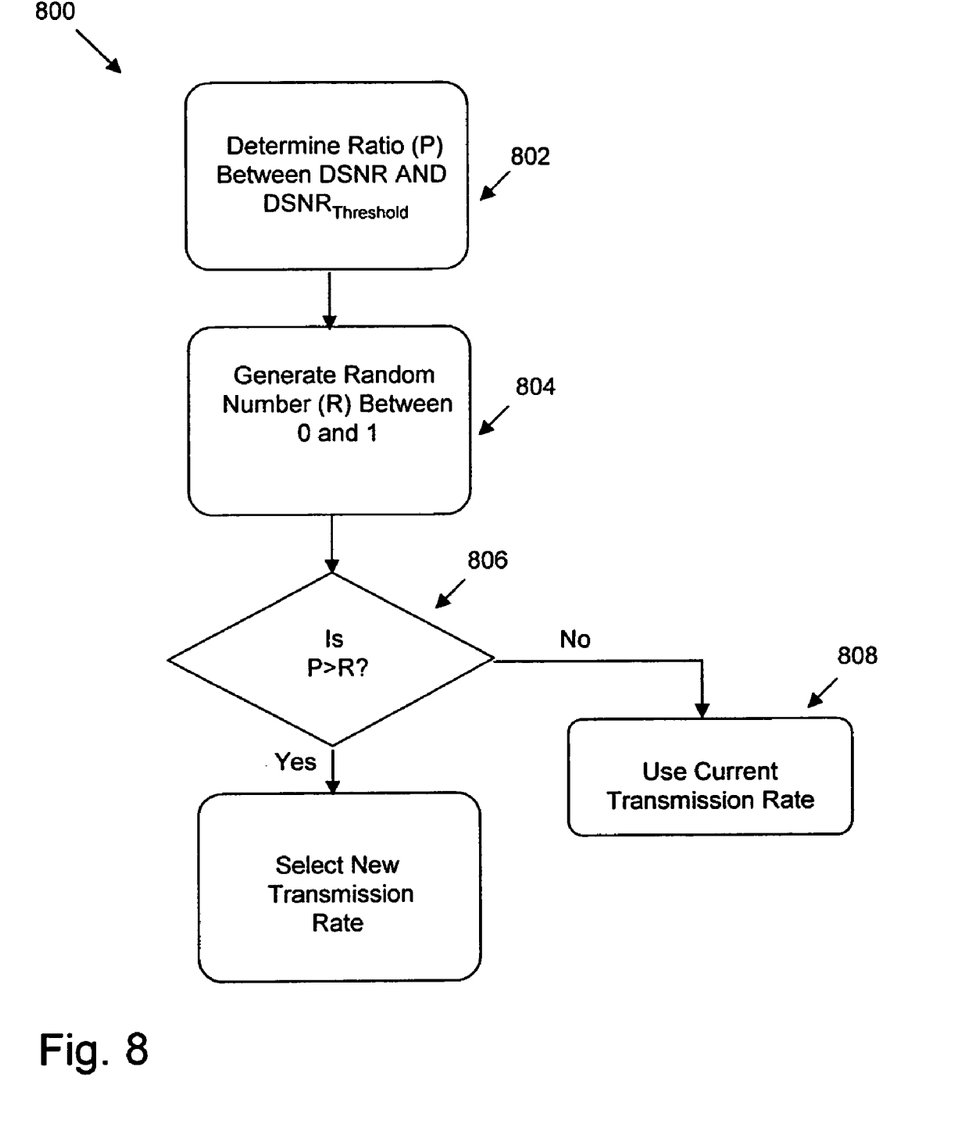
FIG. 8 illustrates an exemplary process for probabilistic selection of a new transmission rate.

FIG. 8 illustrates an exemplary process for selecting a new trans-mission rate such that the probability of selection increases as the ratio of DSNR to $DSNR_{Threshold}$ approaches unity. The exemplary process 800 is executed when the new transmission rate is selected responsive to at least the differential signal to noise ratio (DSNR) and the differential SNR threshold (interchangeably referred to as $DSNR_{Threshold}$).

At block 802, the rate adaptation module 116 determines P, the ratio between the DSNR and the differential SNR threshold.

At block 804, a uniformly distributed random number R can be generated between 0 and 1. Such a random number can be stored in the other data 414 of the memory 112.

At block 806, the value P is compared with the random number R. When the value of P is lesser than or equal to R, a "No" path is traced to block 808, while a "YES" path is traced to block 810 when the value of P is greater than the random number R.

At block 808, the rate adaptation module 116 selects the current transmission rate for further data transmissions when the "NO" path is traced from the block 806.

At block 810, the rate adaptation module 116 selects a new transmission rate when the "YES" path is traced from the block 806.

The probability of selecting the new transmission rate thus depends on the value of P being greater than the random number R. Since the random number R lies between 0 and 1, the probability of P being greater than R will increase as P approaches unity. Thus the probability of selection of the new transmission rate will increase as P approaches unity. This in turn means that the probability of selection of the new transmission rate increases as the value of DSNR approaches the DSNR threshold.

Figure 9:
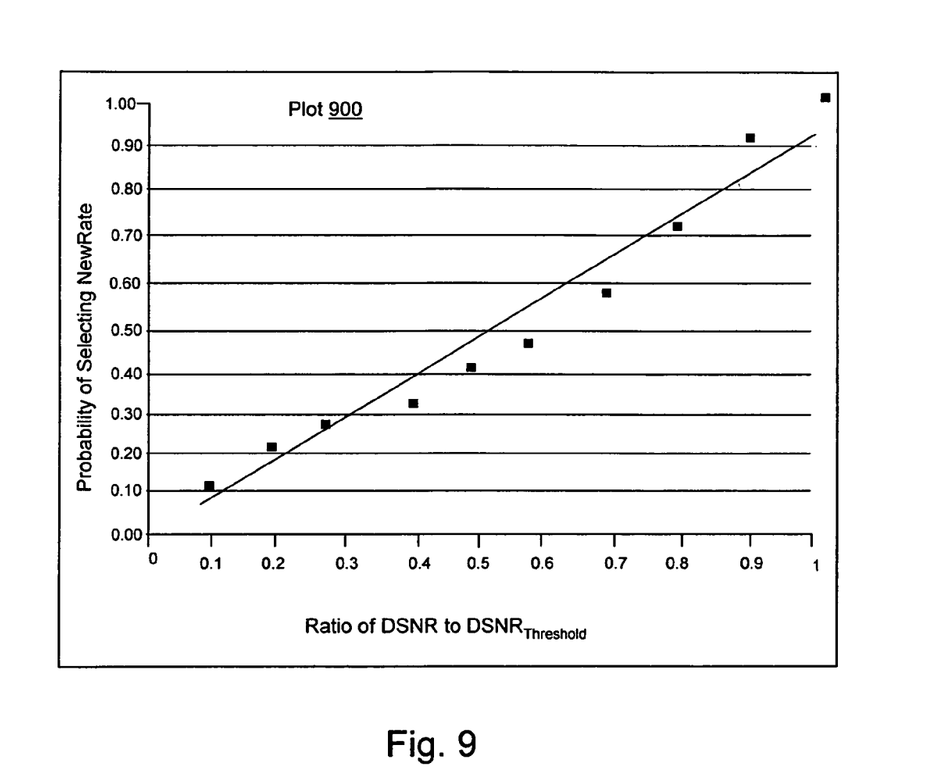
FIG. 9 is a plot of probability of selecting a new transmission rate by the process of FIG. 8.

FIG. 9 is a plot of probability of selecting the new rate vs. the ratio of DSNR to $DSNR_{Threshold}$ as determined by an exemplary execution of the process of FIG. 8.

Plot 900 shows that the probability of selecting the new transmission rate increases as the ratio of the DSNR to $DSNR_{Threshold}$ increases from 0 to 1, when transmission rate is selected using the process 800. In the plot 900, the probability of selecting the new transmission rate varies almost linearly, with the probability approaching zero as the ratio between the DSNR to $DSNR_{Threshold}$ approaches zero. On the other hand, the probability of selecting the new transmission rate approaches unity as the ratio between the DSNR to $DSNR_{Threshold}$ approaches unity. Hence, the variation in the probability of selecting the new transmission rate is uniformly distributed with respect to the ratio between the DSNR to $DSNR_{Threshold}$.

In other implementations, the variation may not be uniformly distributed, but the probability of selecting the new transmission rate may still approach unity as the ratio approaches unity.

Figure 10:
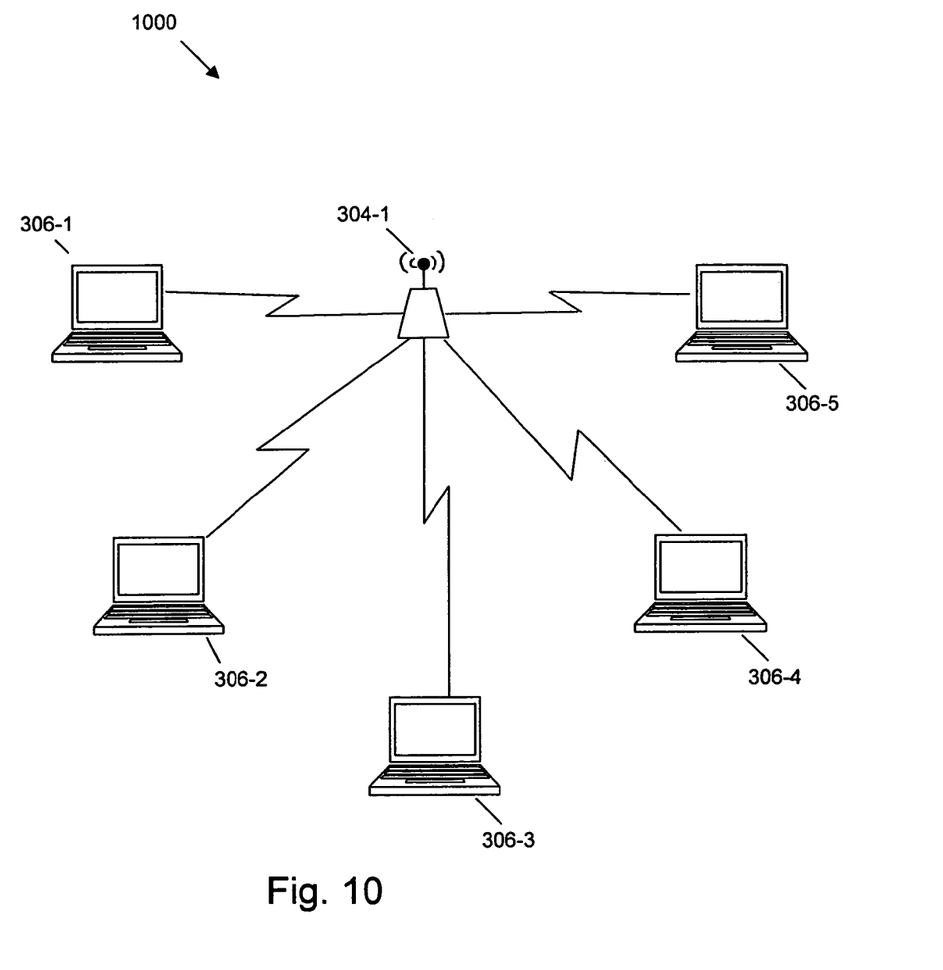
FIG. 10 illustrates a test set-up for implementation of rate adaptation for wireless networks.

FIG. 10 illustrates a test set-up for testing the rate adaptation technique in wireless network. To implement the rate adaptation technique in the probabilistic manner, the wireless network 102 employs a test set-up 1000. The test set-up 1000 can be used to perform a proof-of-concept test to show the effectiveness of the probabilistic rate adaptation technique. In particular, the test set-up 1000 is implemented to resemble a contention scenario.

Contention can occur in wireless networks when several client devices communicate with the same access point at a time. In one embodiment, the client devices can be located at almost equal distances from the access point. During most transmissions, the client devices located at an equal distance from the access point are expected to use the highest rate options say, for example, 54 Mbps. In such situations, all the client devices contend for the same channel, i.e., all the client devices simultaneously send data to the access point and thus lead to data collisions at that particular access point. As a result, the client devices experience non-negligible frame losses due to collisions. Hence, the client devices cannot transmit successfully at the highest rate options available, i.e., at 54 Mbps. However, normally the client devices should be able to transmit most of the frames at 54 Mbps.

The implementation of the probabilistic rate adaptation technique can help solve or mitigate the problem of contention and/or collisions in wireless networks. The contention test set-up 1000 includes a predetermined number of client devices 106 varying from 6 to 10. All the client devices 106-1, 2, 7 are located near the access point 104-1 with a signal strength ranging between −40 to −49 dBm.

The performance of the client device 106-7 is measured at different data rates. The following table shows the results of the 3 trials conducted to measure the performance of the client device 106-7.

TABLE 2

Test Results

| Data Rate | 36 | 48 | 54 | Total counts | Retry counts |
|---|---|---|---|---|---|
| Frame transmission counts | 38 | 11 | 8902 | 8951 | 841 |

The above results show that most frames are transmitted at the highest data rate, i.e., at 54 Mbps. Hence, the results depict the effectiveness of the probabilistic rate adaptation technique in mitigating problems of contention and collisions while transmitting data in wireless networks.

The methods for DSNR based rate adaptation described above may be implemented by a processor or other computing device based on instructions stored on one or more computer-readable media. Computer-readable media can be any available media that can be accessed locally or remotely by the resource modeling application. By way of example, and not limitation, computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Communication media typically embodies computer-readable instructions, data structures, program modules, or other data on any information delivery media. Combinations of the any of the above should also be included within the scope of computer-readable media.

CONCLUSION

Although the invention has been described in language specific to structural features and/or methodological acts for implementing an exemplary method for rate adaptation in wireless networks, it is to be understood that the invention is not necessarily limited to the specific features or acts described. Rather, the specific features and acts are disclosed as exemplary forms of implementing the invention

What is claimed is:

1. A device comprising:
a memory;
one or more processors operatively coupled to the memory;
a differential SNR module configured to determine a differential signal to noise ratio based on a signal to noise ratio for a wireless transmission; and
a rate adaptation module configured to:
determine one or more causes of packet loss based on the differential signal to noise ratio; and
adapt a transmission rate based on the one or more causes, and at least one of the signal to noise ratio and the differential signal to noise ratio.

2. The device of claim 1, wherein the differential SNR module determines the signal to noise ratio as an average signal to noise ratio of data received over a predetermined number of frames and the differential signal to noise ratio as the difference between the signal to noise ratio and a minimum signal to noise ratio.

3. The device of claim 1 further comprising a traffic analysis module configured to determine a time difference between two successive data transmissions.

4. The device of claim 3, wherein the rate adaptation module adapts the transmission rate based on the signal to noise ratio if the time difference is at least equal to a predetermined value.

5. The device of claim 3, wherein the rate adaptation module adapts the transmission rate based on the differential signal to noise ratio if the time difference is less than a predetermined value and the one or more causes comprise loss due to contention.

6. The device of claim 1, wherein the rate adaptation module further adapts the transmission rate based on at least one member selected from a group consisting of a data loss ratio, a transmission throughput, a transmission success count, and a trans-mission failure count.

7. The device of claim 1, wherein the device comprises an access point of a wireless network.

8. The device of claim 1, wherein the device comprises a client device of a wireless network.

* * * * *